United States Patent
Paik et al.

(10) Patent No.: US 12,347,111 B2
(45) Date of Patent: Jul. 1, 2025

(54) DEEP LEARNING MODEL OPTIMIZATION METHOD AND APPARATUS FOR MEDICAL IMAGE SEGMENTATION

(71) Applicant: CHUNG ANG UNIVERSITY INDUSTRY ACADEMIC COOPERATION FOUNDATION, Seoul (KR)

(72) Inventors: Joon Ki Paik, Seoul (KR); Yeong Joon Kim, Hwaseong-si (KR); Dong Goo Kang, Seoul (KR); Yeong Heon Mok, Seoul (KR); Sun Kyu Kwon, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 18/398,759

(22) Filed: Dec. 28, 2023

(65) Prior Publication Data

US 2024/0249416 A1    Jul. 25, 2024

(30) Foreign Application Priority Data

Jan. 25, 2023 (KR) .......................... 10-2023-0009452

(51) Int. Cl.
*G06T 7/11*          (2017.01)

(52) U.S. Cl.
CPC ...... *G06T 7/11* (2017.01); *G06T 2207/20081* (2013.01); *G06T 2207/20084* (2013.01); *G06T 2207/30096* (2013.01)

(58) Field of Classification Search
CPC ............. G06T 7/11; G06T 2207/20081; G06T 2207/20084; G06T 2207/30096; G06N 20/00; G06N 20/10; G06N 20/20
See application file for complete search history.

(56) References Cited

U.S. PATENT DOCUMENTS

2023/0351153 A1* 11/2023 Zhao ...................... G06N 3/042
2023/0351191 A1* 11/2023 Ishii ........................ G06N 3/08

FOREIGN PATENT DOCUMENTS

| CN | 114492624 A | 5/2022 |
| KR | 1020210157128 A | 12/2021 |

OTHER PUBLICATIONS

Karimi et al., Reducing the Hausdorff Distance in Medical Image Segmentation With Convolutional Neural Networks, Jul. 19, 2019, IEEE Transactions on Medical Imaging, vol. 39, No. 2, Feb. 2020, pp. 499-512. (Year: 2019).*

(Continued)

*Primary Examiner* — Shane D Woolwine (57) ABSTRACT

Disclosed are a deep learning model optimization method and apparatus for medical image segmentation. A deep learning model optimization method for medical image segmentation includes: (a) initializing a model parameter; (b) updating the model parameter by performing model-agnostic meta learning (MAML) on a model based on sample batch and applying a gradient descent algorithm to a loss function; (c) setting an optimizer parameter as the updated model parameter, performing one-shot meta-learning on the model, and then updating the optimizer parameter by applying the gradient descent algorithm to the loss function; and (d) updating the model parameter by reflecting the updated optimizer parameter.

8 Claims, 11 Drawing Sheets

(56) References Cited

OTHER PUBLICATIONS

Notification of Preliminary Examination Result for Appl: 10-2023-0009452 from Korean Intellectual Property Office dated Dec. 13, 2023.
Notice of Decision to Grant a Patent for Appl: 10-2023-0009452 from Korean Intellectual Property Office dated Jun. 25, 2024.
Few-shot medical image segmentation network combining self-supervised learning and meta-learning, Society of electronic engineers, Jun. 2022.

* cited by examiner

---
Algorithm 1 MAML: Model-Agnostic Meta-Learning
---
Input: $p(D)$: distribution over tasks, $\alpha, \beta$: step size hyper-parameters, $\theta$: randomly initialized
    while not done do
        Sample batch of tasks $D_i \sim p(D)$
        for step $i = 1, ..., D$ do
            Evaluate $\nabla_\theta L_{Di}(f_\theta)$ with respect to $K$ examples
            Compute adapted parameters with gradient descent: $\theta' = \theta - \alpha \nabla_\theta L_{Di}(f_\theta)$
        end for
        Update $\theta \leftarrow \theta - \beta \nabla_\theta \sum_{Di \sim p(D)} L_{Di}(f_{\theta'})$
    end while
---

Algorithm 2 BM-KFO: Bidirectional Meta-Kronecker Optimizer

---

Input: Fast learning rate $\alpha$, Initial parameters $\theta^{(init)}$, Optimizer Opt
   while $\theta^{(init)}, \xi^{(init)}$ not converged do
      Sample batch of tasks $D \sim p(D)$
      $\theta_1 = \theta^{(init)}, \quad \xi_1 = \xi^{(init)}$
      for train step $i = 1, ..., D$ do
         Compute loss $l_D(\theta_i)$
         Compute adapted parameters with gradient descent: $\nabla_{\theta_i} l_D(\theta_i)$ and $\nabla_{\xi_i} l_D(\theta_i)$
         Update the meta-optimizer parameters $\xi_{i+1} = \xi_i - \alpha \nabla_{\xi_i} l_D(\theta_i)$
         Compute the model update $U_{\xi_{i+1}}(\nabla_{\theta_i} l_D(\theta_i))$
         Update the model parameters $\theta_{i+1} = \theta_i - U_{\xi_{i+1}}(\nabla_{\theta_i} l_D(\theta_i))$
      end for
      Update model and meta-optimizer initializations
         $\theta^{\prime(train)} \leftarrow \theta^{(init)} - Opt(\nabla_{\theta^{init}} l_D(\theta_D))$
         $\xi^{\prime(train)} \leftarrow \xi^{(init)} - Opt(\nabla_{\xi^{init}} l_D(\theta_D))$
      Sample batch of tasks $D \sim p(D)$
      $\theta'_1 = \theta^{\prime(train)}, \quad \xi'_1 = \xi^{\prime(train)}$
      for test step $k = 1, ..., D$ do
         Compute loss $l_D(\theta'_k)$
         Compute gradient descent: $\nabla_{\theta'_k} l_D(\theta'_k)$ and $\nabla_{\xi'_k} l_D(\theta'_k)$
         Update the meta-optimizer parameters $\xi'_{k+1} = \xi'_k - \alpha \nabla_{\xi'_k} l_D(\theta'_k)$
         Compute the model update $U_{\xi'_{k+1}}(\nabla_{\theta'_k} l_D(\theta'_k))$
         Update the model parameters $\theta'_{k+1} = \theta'_k - U_{\xi'_{k+1}}(\nabla_{\theta'_k} l_D(\theta'_k))$
      end for
      Update model and meta-optimizer initializations
         $\theta^{*(test)} \leftarrow \theta^{\prime(train)} - Opt(\nabla_{\theta^{\prime train}} l_D(\theta'_D))$
         $\xi^{*(test)} \leftarrow \xi^{\prime(train)} - Opt(\nabla_{\xi^{\prime train}} l_D(\theta'_D))$
   end while

| Method | Lower | | Upper | | |
|---|---|---|---|---|---|
| | LK | RK | Spleen | Liver | Mean |
| SE-Net[44] | 62.11 | 61.32 | 51.80 | 27.43 | 50.66 |
| Vanilla PANet[30] | 53.45 | 38.64 | 50.90 | 42.26 | 46.33 |
| ALPNet-init | 19.28 | 14.93 | 23.76 | 37.73 | 23.93 |
| ALPNet | 53.21 | 58.99 | 52.18 | 37.32 | 50.43 |
| SSL-PANet | 47.71 | 47.95 | 58.73 | 64.99 | 54.85 |
| SSL-ALPNet | 73.63 | 78.39 | 67.02 | 73.05 | 73.02 |
| CRAPNet[45] | 74.66 | 82.77 | 70.82 | 73.82 | 75.52 |
| Proposed method | 79.89 | 86.86 | 72.13 | 73.43 | 78.07 |

FIG. 7

| Method | Kidneys | | Spleen | Liver | Mean |
| --- | --- | --- | --- | --- | --- |
| | LK | RK | | | |
| SE-Net[44] | 45.78 | 47.96 | 47.30 | 29.02 | 42.51 |
| Vanilla PANet[30] | 30.99 | 32.19 | 40.58 | 50.40 | 38.53 |
| ALPNet | 44.73 | 48.42 | 49.61 | 62.35 | 51.28 |
| SE-FSS[43] | 62.56 | 65.81 | 48.93 | 40.32 | 54.38 |
| SSL-PANet | 58.83 | 60.81 | 61.32 | 71.73 | 63.17 |
| SSL-ALPNet | 81.92 | 85.18 | 72.18 | 76.10 | 78.84 |
| SSL-RPNet[46] | 71.46 | 81.96 | 73.55 | 75.99 | 75.74 |
| CRAPNet[45] | 81.95 | 86.42 | 74.32 | 76.46 | 79.79 |
| Proposed method | 84.14 | 87.07 | 70.79 | 77.42 | 79.85 |

FIG. 8

| Method | Dice score | Precision | Recall | Mean |
|---|---|---|---|---|
| SSL-ALPNet | 73.42 | 78.43 | 69.87 | 73.90 |
| SSL-ALPNet + MAML | 69.50 | 80.79 | 62.32 | 70.87 |
| SSL-ALPNet + Meta-SGD[48] | 73.00 | 82.23 | 70.20 | 75.14 |
| SSL-ALPNet + Meta-curvature[49] | 80.00 | 96.30 | 71.80 | 82.70 |
| Proposed method(+ BM-KFO) | 83.40 | 87.10 | 81.01 | 83.83 |

DEEP LEARNING MODEL OPTIMIZATION METHOD AND APPARATUS FOR MEDICAL IMAGE SEGMENTATION

CROSS-REFERENCE TO RELATED APPLICATION

This application claims priority under 35 U.S.C. § 119(a) to Korean Patent Application No. 10-2023-0009452 filed on Jan. 25, 2023, the entire contents of which are incorporated herein by reference.

BACKGROUND

(a) Technical Field

The present invention relates to a deep learning model optimization method and apparatus for medical image segmentation.

(b) Background Art

AI-based accurate lesion segmentation in medical images serves an important role in applications that support doctors' disease judgment. Semantically, the segmentation may be considered to be key in research using MRI or CT images. Recent development in deep learning has become an inflection point for AI to achieve human-level performance.

With the advent of the deep learning era, researches beyond manual-based methods have been conducted in various fields, and thus, FCN2, U-Net3, DeepLab v3 plus4, and SegNet5 models have improved the performance of the semantic segmentation.

However, there is a problem in that, due to specificity of the medical images, it is difficult to secure large amounts of data, medical image data requires expert knowledge for disease classification and judgment, and annotation is costly and difficult, and due to patients' sensitive personal information, it is difficult to conduct research through data acquisition.

SUMMARY

The present disclosure is to provide a deep learning model optimization method and apparatus for medical image segmentation.

In addition, the present disclosure is to provide a deep learning model optimization method and apparatus for medical image segmentation capable of improving medical image segmentation performance by configuring optimizer parameters independent of model parameters and additionally updating the model parameters using the configured optimizer parameters.

In addition, the present disclosure is to provide a deep learning model optimization method and apparatus for medical image segmentation capable of improving medical image segmentation performance by additionally performing one-shot learning after performing few-shot learning.

In addition, the present disclosure is to provide a deep learning model optimization method and apparatus for medical image segmentation capable of reducing prediction noise using an average Hausdorff distance loss that focuses on a segmentation shape rather than a region.

According to an aspect of the present disclosure, there is provided a deep learning model optimization method for medical image segmentation.

According to an embodiment of the present disclosure, there may be provided a deep learning model optimization method for medical image segmentation, including: (a) initializing a model parameter; (b) updating the model parameter by performing model-agnostic meta learning (MAML) on a model based on sample batch and applying a gradient descent algorithm to a loss function; (c) setting an optimizer parameter as the updated model parameter, performing one-shot meta-learning on the model, and then updating the optimizer parameter by applying the gradient descent algorithm to the loss function; and (d) updating the model parameter by reflecting the updated optimizer parameter.

A test process may be further performed after the step (d), and the test process may further perform the steps (a) to (d) based on a query data set to find a final model parameter.

In the step (b), the meta learning may be few-shot learning.

The loss function may calculate a sum of a cross entropy loss and an average Hausdorff distance loss.

The average Hausdorff distance loss may be calculated using Equation below:

$$L_{AHDLoss}(X, Y) = \left( \frac{1}{X} \sum_{x \in X} \min_{y \in Y} D_{dist}(x, y) + \frac{1}{Y} \sum_{y \in Y} \min_{x \in X} D_{dist}(x, y) \right)/2.$$

Here, X and Y represent a predicted value and an actual measured value, respectively, Od Y) represents a function that derives a distance to x and y, and min represents a function that derives a minimum value.

According to another aspect of the present disclosure, there is provided an apparatus for performing a deep learning model optimization method.

According to another aspect of the present disclosure, a computing device may include: a memory storing at least one instruction; and a processor executing the instruction stored in the memory, in which the instruction executed by the processor may include: initializing a model parameter; updating the model parameter by performing model-agnostic meta learning (MAML) on a model based on sample batch and applying a gradient descent algorithm to a loss function; setting an optimizer parameter as the updated model parameter, performing one-shot meta-learning on the model, and then updating the optimizer parameter by applying the gradient descent algorithm to the loss function; and deriving a final model parameter by repeatedly performing a training process and a test process including the updating of the model parameter by reflecting the updated optimizer parameter.

By providing a deep learning model optimization method and apparatus for medical image segmentation according to an embodiment of the present disclosure, it is possible to improve medical image segmentation performance by configuring optimizer parameters independent of model parameters and additionally updating the model parameters using the configured optimizer parameters.

In addition, according to the present disclosure, it is possible to improve medical image segmentation performance by additionally performing one-shot learning after performing few-shot learning.

In addition, according to the present disclosure, it is possible to reduce prediction noise using an average Hausdorff distance loss that focuses on a segment shape rather than a region.

BRIEF DESCRIPTION OF DRAWINGS

FIG. 4 is a diagram illustrating a pseudo code for a deep learning model optimization method according to an embodiment of the present disclosure.

DETAILED DESCRIPTION

In the present specification, singular forms include plural forms unless the context clearly indicates otherwise. In the specification, it is to be noted that the terms "comprising" or "including," and the like are not be construed as necessarily including several components or several steps described in the specification and some of the above components or steps may not be included, or additional components or steps are construed as being further included. In addition, the terms " . . . unit," "module," and the like described in the specification refer to a processing unit of at least one function or operation and may be implemented by hardware or software or a combination of hardware and software.

Hereinafter, exemplary embodiments of the present disclosure will be described in detail with reference to the accompanying drawings.

Figure 1:
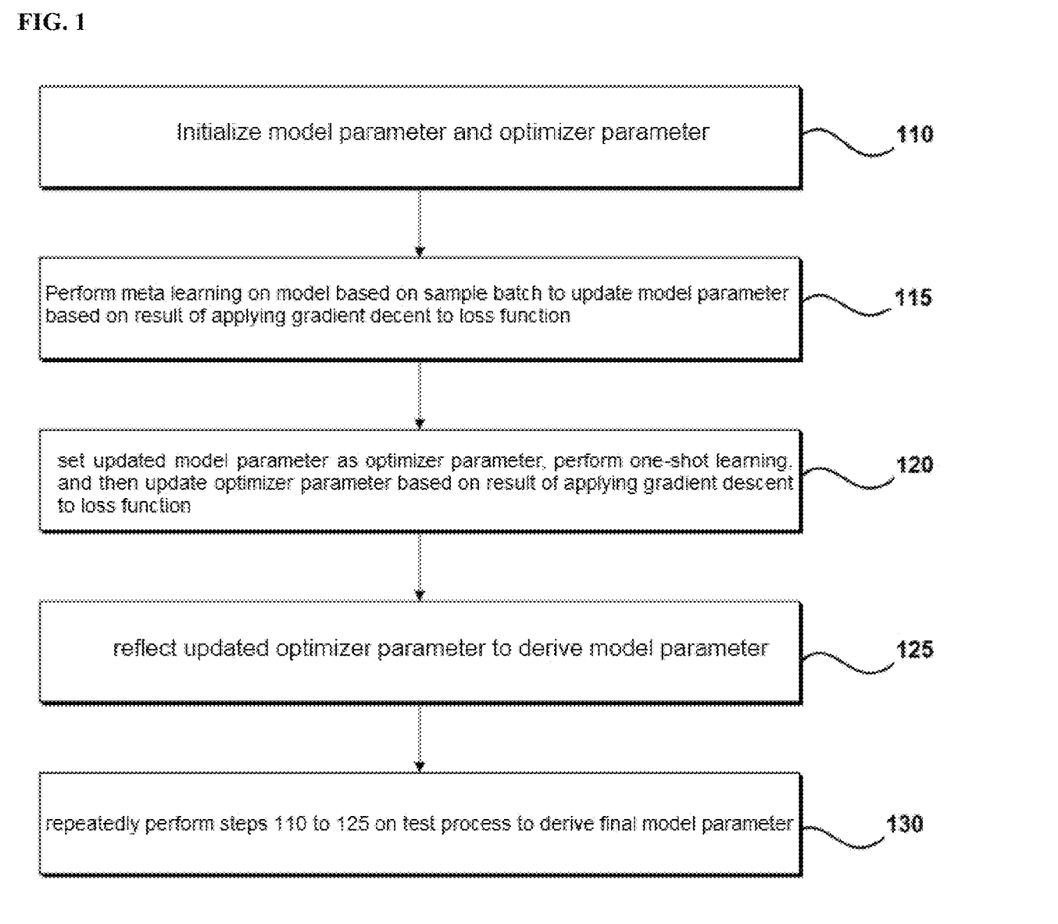
FIG. 1 is a flowchart illustrating a deep learning model optimization method for medical image segmentation according to an embodiment of the present disclosure.
Figure 2:
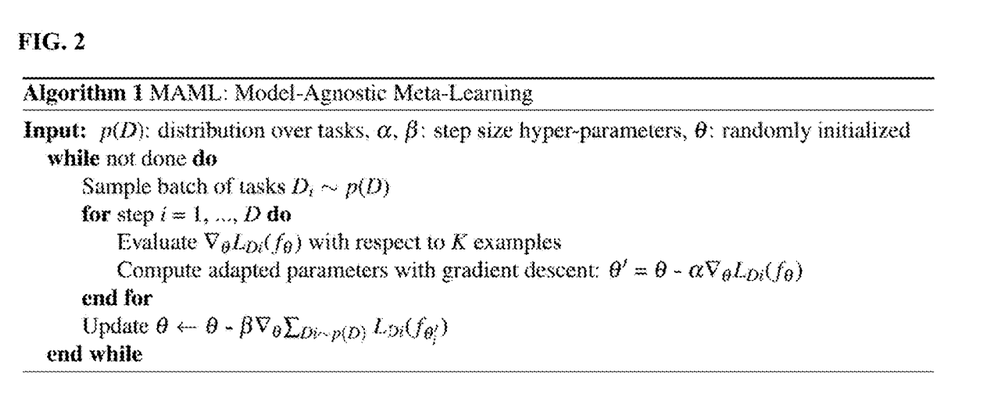
FIG. 2 is a diagram illustrating meta-learning pseudo code.
Figure 3:
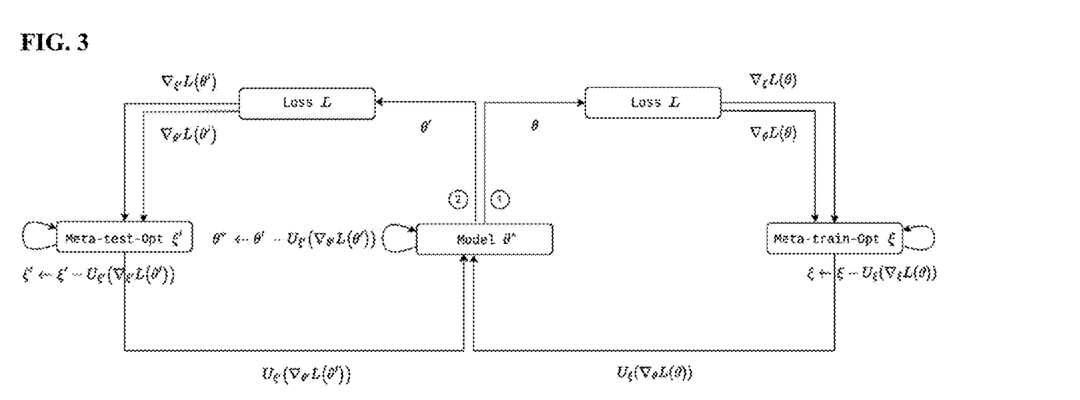
FIG. 3 is a diagram illustrating a parameter derivation process of the deep learning model optimization method according to an embodiment of the present disclosure.
Figure 5:
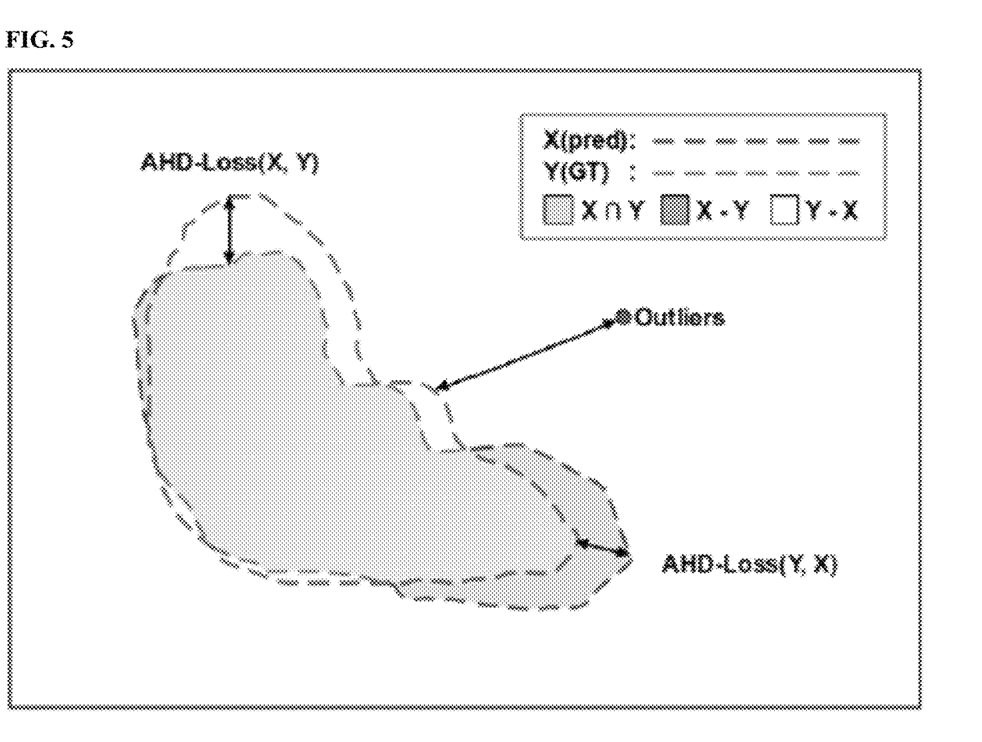
FIG. 5 is a diagram illustrating an average Hausdorff distance loss according to an embodiment of the present disclosure.
Figure 6:
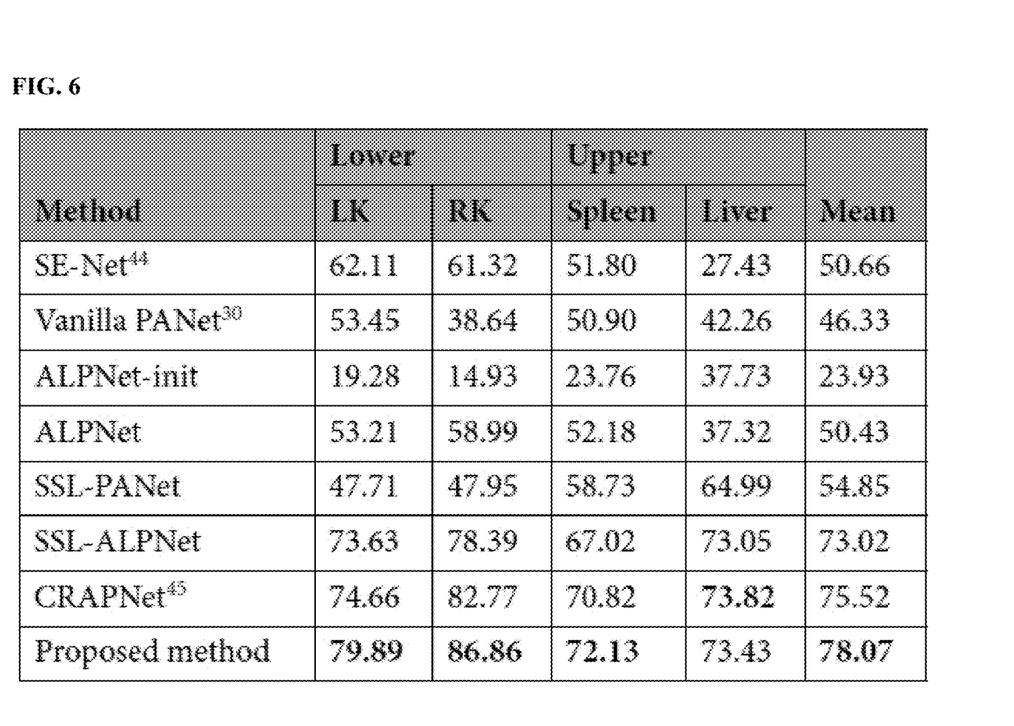
FIGS. 6 and 7 are diagrams illustrating experimental results on a medical image according to the related art and an embodiment of the present disclosure.
Figure 7:
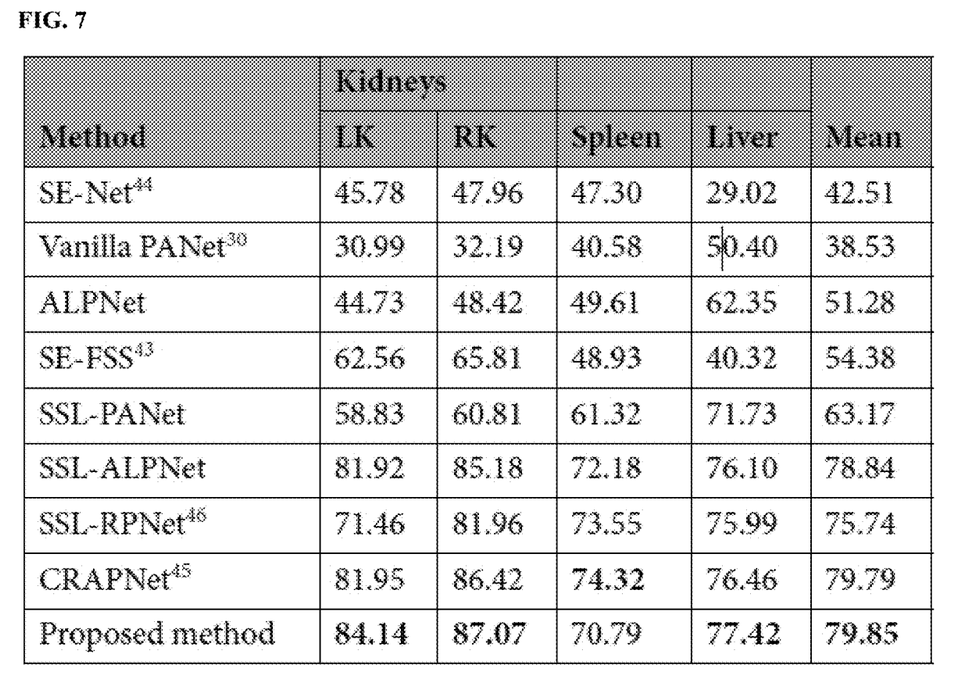
Figure 8:
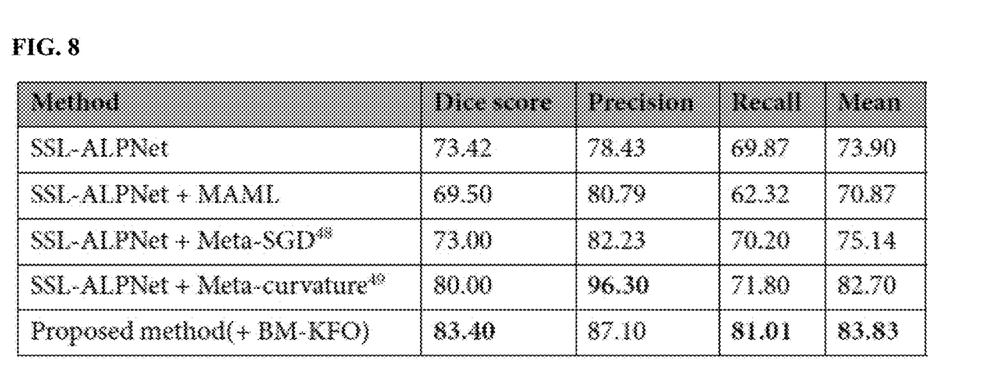
FIG. 8 is a comparison diagram of a baseline and performance results according to an embodiment of the present disclosure.
Figure 9:
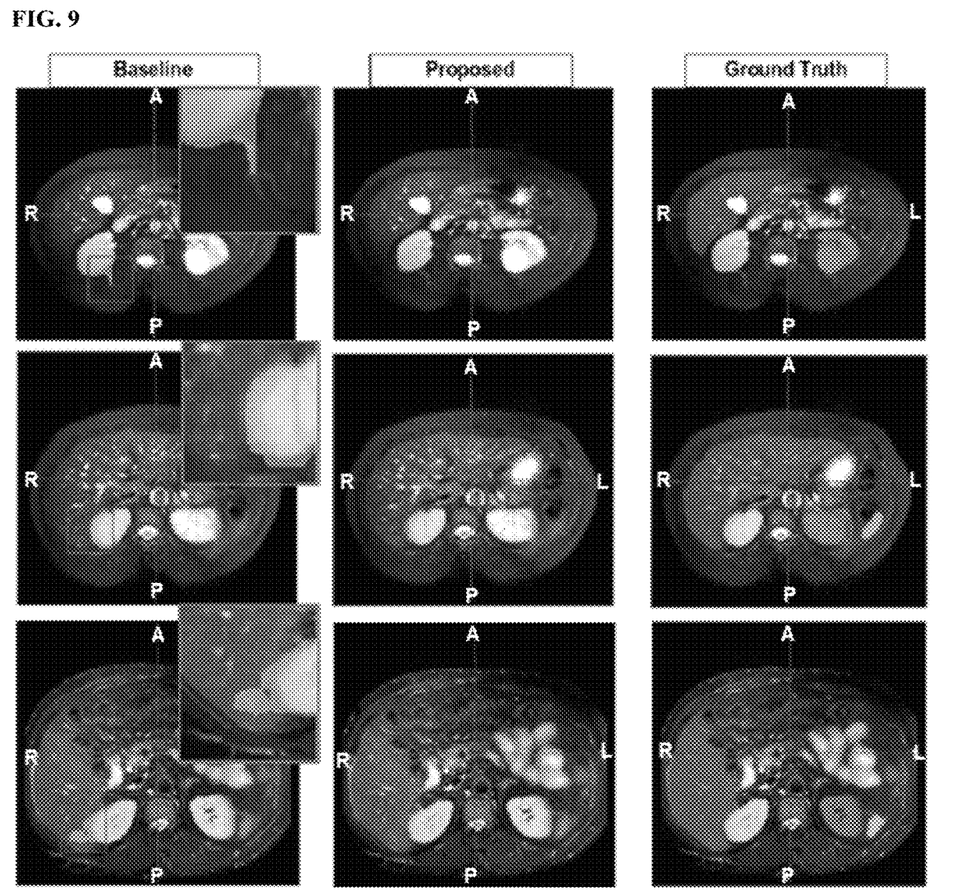
FIG. 9 is a diagram illustrating a visual comparison between the baseline and the medical image segmentation according to the deep learning model optimization method according to an embodiment of the present disclosure.

FIG. 1 is a flowchart illustrating a deep learning model optimization method for medical image segmentation according to an embodiment of the present disclosure, FIG. 2 is a diagram illustrating meta-learning pseudo code, FIG. 3 is a diagram illustrating a parameter derivation process of the deep learning model optimization method according to an embodiment of the present disclosure, FIG. 4 is a diagram illustrating a pseudo code for a deep learning model optimization method according to an embodiment of the present disclosure, FIG. 5 is a diagram illustrating an average Hausdorff distance loss according to an embodiment of the present disclosure, FIGS. 6 and 7 are diagrams illustrating experimental results on a medical image according to the related art and an embodiment of the present disclosure, FIG. 8 is a comparison diagram of a baseline and performance results according to an embodiment of the present disclosure, and FIG. 9 is a diagram illustrating a visual comparison between the baseline and medical image segmentation according to the deep learning model optimization method according to an embodiment of the present disclosure.

To optimize a deep learning model, a computing device may perform a training-verification-testing process for a model step by step.

In step 110, the computing device initializes model parameters and optimizer parameters.

In step 115, the computing device performs model-agnostic meta learning (MAMA) on the model based on a sample batch, and updates the model parameters by applying a gradient descent algorithm to an objective function.

To facilitate understanding and explanation, the meta-learning will be briefly described with reference to FIG. 2. The meta-learning is learning a deep learning model learning method, and is different from the conventional multi-learning. The conventional multi-learning is a form in which each task shares optimal parameters φ, and is learned in a form in which a model may support various tasks, and is a learning method for simultaneously finding parameters φ of models optimized for a plurality of tasks when a data set is input to a new task.

On the other hand, in the meta-learning, learning is performed in the order of finding φ of a new task from θ through a process of finding a new parameter θ for a correlation between a parameter φ of the learned model and characteristics of a new data set, under the assumption that the optimal parameter $\phi_i$ is different for each task.

For the meta-learning, each task is composed of a data set $D \in \mathbb{R}^2$, and the model parameter may be calculated as in Equation 1:

$$\theta = \underset{\theta}{\mathrm{argmin}} \mathbb{E}_{D \sim p(D)} \left[ L_{D \sim p(D)}^{validation} \left( \theta - \alpha \nabla L_{D \sim p(D)}^{train}(\theta) \right) \right]. \qquad \text{[Equation 1]}$$

where θ represents the set of model parameters, $\mathbb{E}$ D~p (D) the expectation over a distribution of dataset D, and L(θ) the loss function for a given dataset D and model parameters θ. $\theta - \alpha \nabla L_{D-p(D)}^{train}$ (·) denotes the gradient update for training data, where α represents the learning rate, and $\nabla L_{D-p(D)}^{train\,(\theta)}$ is the gradient of the loss function L with respect to θ on the training data. Lvalidation $L_{D-p(D)}^{validation}$ $(\theta - \alpha \nabla L_{D-p(D)}^{train\,(\theta)})$ represents the loss function on the validation data, where $\theta - \alpha \nabla L_{D-p(D)}^{train\,(\theta)}$ is the updated parameter using the training data. We compute the loss function on the validation data using the updated parameter. Thus, Optimizing the minimized arg min θ becomes the objective function. Although this formula looks similar to the general learning method, we need to find a model parameter that is optimized for all n tasks since each task is different here.

This learning-to-learn meta-learning typically includes metric-based, model-based and optimization-based approaches.

The metric-based meta-learning is similar to k-NN and kernel density estimation algorithms. For example, k support data sets and query data sets are projected onto an embedding space through a feature extractor, and then learned to minimize a metric or distance between a support data set and a query data set. Here, the feature extractor may be a backbone network (ResNet).

The goal of metric-based meta-learning is similar to nearest neighbors (k-NN) and kernel density estimation algorithm. First, k support sets and query set are projected onto the embedding space through the feature extractor, and then learned in the direction to minimize the metric or distance between the support set and the query set.

On the other hand, the core of model-based meta-learning is to design a model architecture specific to fast learning. This approach aims to update its parameters rapidly with a few training steps. Shaban et al. proposed a fully convolutional network (FCN)-based few-shot segmentation method, which produces a set of parameters using a pre-trained feature extractor learned by a support set and then multiply to parameters from FCN that passed query image which is conditioned on an annotated support set of images via feature fusion to inference on an unseen query image. Recently, attention-based approach and graph convolutional network-based approach have become popular as research subjects because of their efficient use of feature relationships. In addition, the method using the global correlation network with discriminative embedding (GCN-DE) and the method using the location-sensitive local prototype network show impressive results in the few-shot task. Sun et al. proposed a medical image segmentation method that incorporated discriminative embedding into a global correlation network. This method employs a deep convolutional network trained episodically, incorporating an efficient global correlation module to capture the correlation between support and query images. Furthermore, it enhances the discriminability of deep embedding for efficient feature domain clustering a prototype-based few-shot segmentation method that leverages spatial priors in medical imaging, addressing the need for large amounts of expert-level annotated data. Their methodology involves two main steps: (1) location-sensitive local prototype extraction and (2) grid-based few-shot segmentation. Their approach divides the challenging problem of global image segmentation into smaller, more manageable sub-problems of local region segmentation. The proposed method is different in that it focuses on the meta-learning algorithm and the objective function.

Optimization-based meta-learning methods assume that there are some internal representations that are more transferable than others. Under this assumption, it might learn internal features that are widely acceptable to all tasks rather than a single task. The pioneering work in this aspect is MAML, which aims to find model parameters called meta-gradient that are sensitive to changes in the task, such that small changes in the parameters will produce large impacts on the loss function of any task. The meta-gradient update involves a gradient through a gradient.

In addition, the model-based meta-learning is designed to design model architecture specialized for fast-learning, and helps to quickly update parameters with few training steps.

In addition, the optimization-based meta-learning assumes that there is an internal representation that is more transferable than other techniques. Under this assumption, it is possible to learn internal features that are widely accepted for all tasks, not just a single task.

For example, a representative example of the optimization-based meta learning is model-agnostic meta learning (MAML) which aims to find the model parameters called the meta-gradient that is sensitive to a change in task. The general pseudo code for the MAML algorithm is as illustrated in FIG. 2.

Small change in the model parameters have a large impact on an objective function (loss function) of all the tasks. In an embodiment of the present disclosure, it should be understood that the model performs the optimization-based meta-learning even if there is no separate description. The meta-learning aims to find the objective function that optimizes the model parameters θ of the model.

A data set D used for the meta-learning may include the support data set and the query data set. In an embodiment of the present disclosure, it is assumed that the feature map is extracted by applying the medical image to the backbone network.

According to an embodiment of the present disclosure, instead of using only support images to learn a model, self-supervised learning with superpixel pseudo labels may be additionally applied. That is, a pseudo label may be generated as a super-pixel version of the support image. The model may be meta-learned using the corresponding support image and support label (pseudo label) as the support data set.

When meta-learning the model, the training data will be referred to as D, and the training data D may include the support data set and the query data set.

That is, the computing device performs the meta-learning on the model based on the sample batch to update the model parameters through the gradient descent algorithm (SGD) for the objective function. For convenience, the updated model parameters are referred to as θ'. The sample batch is composed of the training data D, and the training data D may include the support data set and the query data set. In addition, as described above, the support data set may include a support image and a label. The support data set may be used in the training process, and the query data set may be used in the testing process.

Assuming a meta initial parameter (i.e., the model parameter) as θ, a loss function for the model parameter θ is expressed as L(θ), and the model parameters for each task may be calculated as in Equation 2 below:

$$\theta' = \mathbb{E}_{D \sim p(D)}[(\theta - \alpha \nabla L_D(f_\theta))]. \qquad \text{[Equation 2]}$$

Here, α represents a learning rate, and p(D) represents a training data distribution of each task. $\mathbb{E}_{D \sim p(D)}$ represents an expected value of data randomly extracted from the training data.

The model parameters may be updated using the loss calculated as parameters for each task using the gradient descent. This is shown as in Equation 3 below:

$$\theta \leftarrow \theta - \beta \nabla_\theta \sum_{D \sim p(D)} L_{D_i}(f_{\theta_i})$$

Here, β represents a meta step size. The basic algorithm of the meta-learning is as illustrated in FIG. 2. Briefly described with reference to FIG. 2, an inner loop statement may optimize the parameters θ' for each task through the gradient descent during the meta-learning. An outer loop parameter θ may be calculated by an inner loop code. The meta initial parameter may be updated by the gradient of the loss function calculated for each task. In addition, the network may start optimization from a generalized initial point through the inner-outer loop design.

To summarize again, in an embodiment of the present disclosure, the model parameters may be updated by performing the meta-learning on the model based on the sample batch and then applying the gradient decent to the loss function.

In step 120, the computing device sets the optimizer parameters as the updated model parameters, performs the one-shot learning on the model, and then updates the optimizer parameters by applying the gradient descent algorithm to the loss function.

Here, the optimizer parameters should be understood as parameters independent of the model parameters. The optimizer parameters may receive the updated model parameters as they are, and the optimizer parameters may be updated by applying the gradient decent to the loss function based on the results of performing the one-shot learning on the model.

In step 125, the computing device updates the model parameters by reflecting the updated optimizer parameters. As a result, according to an embodiment of the present disclosure, the model parameters may be updated once based on the results of performing few-shot learning on the sample batch, and updated twice based on the results of performing the one-shot learning.

In step 130, the computing device performs a test process by repeatedly performing steps 115 to 125 as a training process using the query data set.

Similar to the training process, the testing process also may update the model parameters based on the results of performing the meta-learning on the sample batch, set the model parameters as the optimizer parameters and then update the optimizer parameters based on the results of performing the one-shot learning, and then reflect the updated optimizer parameters to derive final model parameters. The training process and the test process differ only in the data set, but the process itself is the same, and therefore, redundant descriptions will be omitted.

The process may be summarized as illustrated in FIG. 3.

Referring to FIG. 3, the deep learning model optimization method for medical image segmentation according to an embodiment of the present disclosure may perform the meta-learning on the model based on the sample batch, apply the gradient decent to the loss function to update the model parameters, and set the updated model parameters as the optimizer parameters, and then perform the one-shot learning on the model and then update the optimizer parameters by applying the gradient decent to the loss function. Next, the model parameters may be updated by reflecting the updated optimizer parameters.

The corresponding process is the training process, and the test process may also be repeated in the same way. As a result, the model parameters may be finally obtained based on the result values of the loss function by performing the meta-learning, such as the few-shot learning (meta-learning) and the one-shot learning, twice. The pseudo code for this is as illustrated in FIG. 4.

This may be as shown in Equation 4:

$$\theta' \leftarrow \theta - \beta \frac{\partial L(\theta)}{\partial \theta},$$ [Equation 4]

$$\xi' \leftarrow \xi - \beta \frac{\partial L(\theta)}{\partial \xi}.$$

$$(BM - KFO): \theta^* \leftarrow \theta' - U_{\xi'}(\nabla_{\theta'} \text{Loss}(\theta'))$$ [Equation 5]

where $\theta'$ and $\xi'$ take $\theta$ and $\xi$ of each parameter as inputs, and produce $\nabla_\theta \text{Loss}(\theta)$. This process is a meta-trainoptimizer, and the process of entering $\theta'$ and $\xi'$ once again and finding $\theta^*$ becomes the meta-test-optimizer. $\theta^*$ is the final model parameter passed through meta-train optimizer and meta-test optimizer.

The loss function for the model parameters may be expressed as Equation 6:

$$L(\theta) = \mathbb{E}_{D \sim p(D)}[\text{loss}_D(\theta - \alpha U_\xi(\nabla \text{loss}_D(\theta)))].$$ [Equation 6]

$$U_\xi(\nabla \text{loss}(\theta)) = f(\nabla \text{loss}(\theta); \phi)$$ [Equation 7]

where L(θ) represents the objective function, which is defined as the expectation over a distribution of datasets D drawn from a probability distribution p(D). The function $\text{loss}_D(\theta)$ represents the loss function for a particular dataset D and model parameters θ. The term $\alpha U_\xi(\nabla \text{loss}_D(\theta))$ denotes the update rule for the meta-parameters θ, where α is the learning rate and $U_\xi(\nabla \text{loss}_D(\theta))$ represents the update for θ obtained from the meta-optimizer with optimizer parameter $\xi$. In Equation 5, f (·) represents a small parameterized neural network that does not increase the entire model parameters that are independent of the model parameter θ. Where $\xi$ denotes the hyperparameters of the function $U_\xi$ and ϕ are values used to optimize other hyperparameters. Based on these two methods, we differentiated the parameters of the model and optimizer and constructed a meta-train optimizer and a meta-test optimizer. Unlike the MAML method, which only updates model parameters during learning, model parameters, and optimizer parameters are separated, and opti-parameters are simultaneously updated starting with the initial model parameters. These updates are applied to the meta-train optimizer and the metatest optimizer, respectively, and finally, the updated parameter creates θ*. In other words, a shallow network may provide a better meta-learning function.

Tens of thousands of parameters that do not directly affect network complexity are present in the meta optimizer $U_\xi$. To reduce computational complexity and memory usage, the matrix was decomposed into Kronecker products. For example, given an m×n matrix A and a p×q matrix B, the Kronecker product between A and B may be expressed as Equation 8:

$$A = \begin{bmatrix} A_{11} & \cdots & A_{1n} \\ \vdots & \ddots & \vdots \\ A_{m1} & \cdots & A_{mn} \end{bmatrix} \in Mat(m, n; \mathbb{R}), B = \begin{bmatrix} B_{11} & \cdots & B_{1q} \\ \vdots & \ddots & \vdots \\ B_{p1} & \cdots & B_{pq} \end{bmatrix} \in Mat(p, q; \mathbb{R}),$$

$$A \otimes B \in Mat(mp, nq; \mathbb{R}), A \otimes B = \begin{bmatrix} A_{11}B & \cdots & A_{1n}B \\ \vdots & \ddots & \vdots \\ A_{m1}B & \cdots & A_{mn}B \end{bmatrix} \in \mathbb{R}^{mp \times nq},$$

where A is an m×n matrix, and B is a matrix. A⊗B denotes the Kronecker product of A and B, which is a matrix of size mp×nq with real entries. The entries of A⊗B are obtained by taking each entry $A_{ij}$ of A and multiplying it by the entire matrix B. More specifically, the (i,k)-th entry of A⊗B is given by $(A \otimes B)_{ik} = A_{ij}B_{kl}$, where i and j are such that 1≤i≤m and 1≤j≤n, and k and l are such that 1≤k≤p and 1≤l≤q.

As shown in Equation 8, the optimizer parameters may be decomposed into Kronecker factorization as shown in Equation 9:

$$W = R^T \otimes L \in \mathbb{R}^{m \times n}, \text{ for } R \in \mathbb{R}^{m \times n} \text{ and } L \in \mathbb{R}^{n \times n}$$

Among various decomposition methods, the Kronecker factorization is used for the following reasons: i) the computation and memory cost of the Kronecker product are acceptable, ii) when L and β are a full rank, $R^T \nabla L$ is a full rank, and iii) an identity matrix is in a range of a Kronecker decomposition matrix.

In particular, it allows the meta optimizer to recover the gradient descent updates by using the β and L as an identical equation.

In an embodiment of the present disclosure, the average Hausdorff distance is used as the objective function to alleviate the unstable learning problem of the few-shot learning. The Hausdorff distance loss is defined as a non-linear function that measures a disparity distance between two sets. A max-min method using a general distance function is as shown in Equation 10:

$$D_{distance}(x, y) = \|x - y\|. \quad \text{[Equation 10]}$$

Given two sets $X = \{x_1, x_2, \ldots, x_m\}$ and $Y = \{y_1, y_2, \ldots, y_n\}$ the Hausdorff distance from a point in X to a point in Y, represented by D), may be defined as Equation 11:

$$D_{distance}(x, Y) = \min_{y \in Y} d(x, y). \quad \text{[Equation 11]}$$

The Hausdorff distance from set X to set Y may be expressed as Equation 12:

$$HD(X, Y) = \max_{x \in X} D_{distance}(x, Y) = \max_{x \in X} \min_{y \in Y} \|x - y\|. \quad \text{[Equation 12]}$$

Conversely, the distance from Y to X may be expressed as Equation 13:

$$HD(Y, X) = \max_{y \in Y} D_{distance}(y, X) = \max_{y \in Y} \min_{x \in X} \|y - x\|. \quad \text{[Equation 13]}$$

Assuming that the predicted image is X and the actual measured image is Y, the loss function may be expressed as Equation 14:

$$L_{HDLoss}(Pred, GT) = \max(HD(Pred, GT), HD(GT, Pred)). \quad \text{[Equation 14]}$$

The HD loss functions such as Equation 14 have the problem of being sensitive to outliers. Therefore, in an embodiment of the present disclosure, the average Hausdorff distance from the set X to the Y direction is used as the loss function.

The average Hausdorff distance is calculated as a value obtained by dividing the sum of the minimum distances from all points from a point in X to Y by the number of points in X, and is calculated in both directions. Accordingly, this may be as shown in Equation 15:

$$L_{AHDLoss}(X, Y) = \left( \frac{1}{X} \sum_{x \in X} \min_{y \in Y} D_{dist}(x, y) + \frac{1}{y} \sum_{y \in Y} \min_{x \in X} D_{dist}(x, y) \right) / 2$$

This average Hausdorff distance loss is visualized as illustrated in FIG. 5.

Therefore, the average Hausdorff distance loss may calculate the distance between the actual measured value and the predicted value, and has the advantage of being sorted and robust against outliers over the general Hausdorff distance loss.

As shown in Equation 15, the average Hausdorff distance loss has the advantage of calculating the difference between the actual measured value and the predicted value from both perspectives, allowing the model to focus on the overall shape of the organ rather than the intersection point. Distance measurement methods that are robust to the outliers include Euclidean, Chebyshev, and Manhattan distances.

The Manhattan distance may be derived as Equation 16:

$$D_{manhattan}(X, Y) = \sum_{i}^{n} (|x_i, y_i|)$$

The Manhattan distance is also called the L1 distance and is equal to the sum of the differences between each coordinate.

The Euclidean distance is derived as shown in Equation 17, and is also called the L2 distance, and is the shortest distance between coordinates:

$$D_{euclidean}(X, Y) = \left( \sum_{i}^{n} (|x_i, y_i|^2) \right)^{\frac{1}{2}}$$

The Chebyshev distance may be derived as Equation 18:

$$D_{chebyshev}(X, Y) = \max_i (|x_i, y_i|)$$

In an embodiment of the present disclosure, the Chebyshev distance is used because the distance in all directions may be measured compared to the distance in Equations 16 and 17.

According to an embodiment of the present disclosure, the final objective function is the sum of the average Hausdorff distance loss and the cross entropy loss, and may be derived as shown in Equation 19:

$$L_{Total} = L_{CE} + L_{AHDLoss}$$

$$L_{CE} = -\sum_{i=1}^{n} y_i \log(\hat{y}_i)$$

Here,

FIGS. 6 and 7 are diagrams illustrating experimental results on a medical image according to the related art and an embodiment of the present disclosure.

FIG. 6 illustrates the results of the experiment after removing the model learned with images of a test class from the training data, and FIG. 7 illustrates the results of the experiment for the other case.

As illustrated in FIGS. 6 and 7, it can be seen that the deep learning model optimization method according to an embodiment of the present disclosure has better performance than the related art.

In addition, FIG. 8 is a comparison diagram of a baseline and performance results according to an embodiment of the present disclosure, and the comparison results in terms of dice score, precision, and recall are illustrated in FIG. 8, and it can be seen that the medical image segmentation performance according to the deep learning model optimization method according to an embodiment of the present disclosure is significantly better than the baseline.

FIG. 9 is a diagram illustrating a visual comparison between the baseline and the medical image segmentation according to the deep learning model optimization method according to an embodiment of the present disclosure.

As illustrated in FIG. 9, it can be seen that the method according to an embodiment of the present disclosure accurately segments a right kidney, but the baseline generates an irregular shape. The method according to an embodiment of the present disclosure focuses more on differences in boundaries and shapes of organs than the related art and obtains better results in various shapes and sizes.

Figure 10:
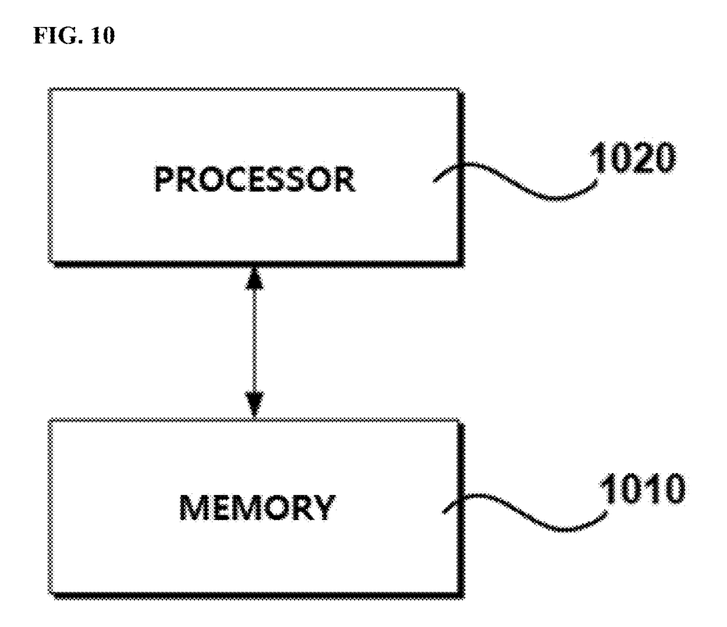
FIG. 10 is a block diagram schematically illustrating an internal configuration of a computing device that performs a deep learning model optimization method according to an embodiment of the present disclosure.
Figure 11:
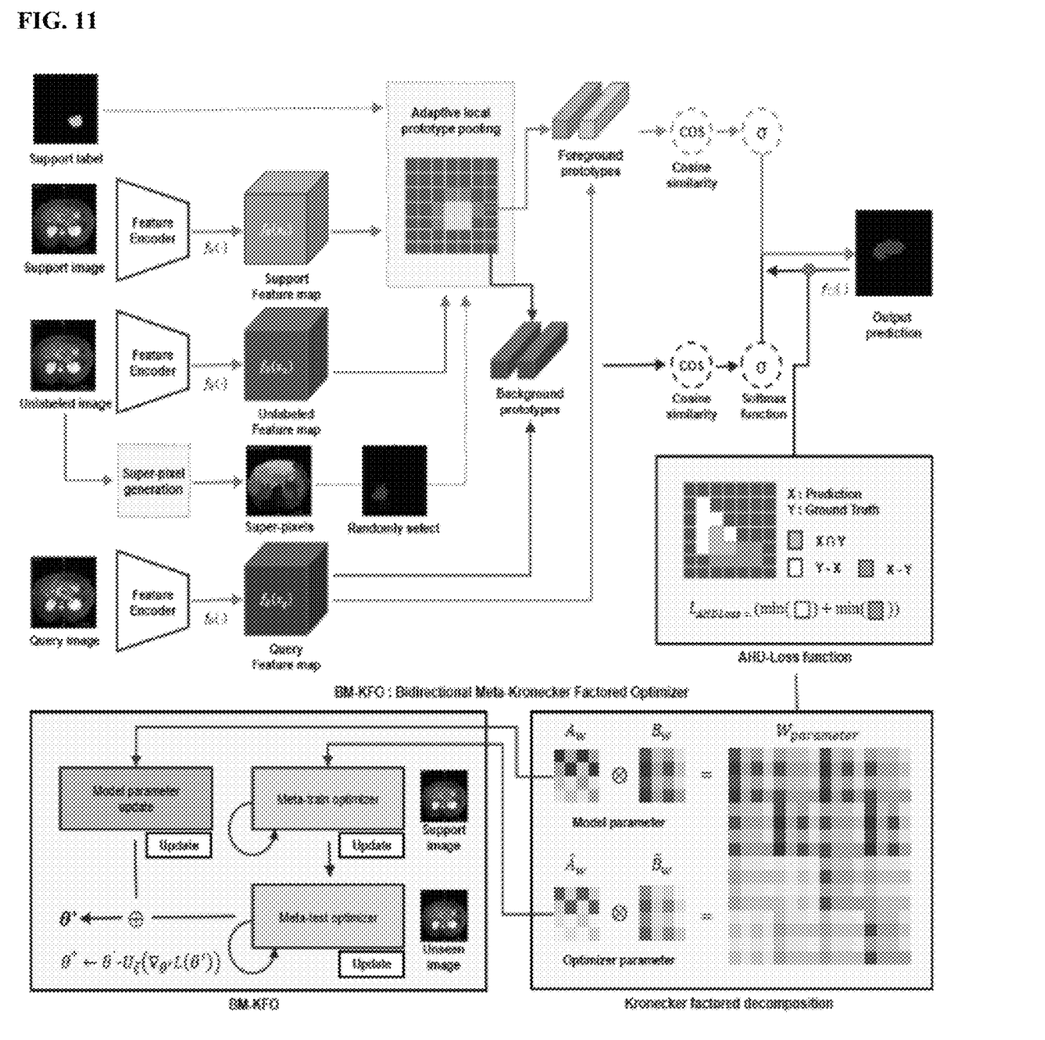
FIG. 11 is a diagram illustrating the overall architecture according to an embodiment of the present disclosure.

FIG. 10 is a block diagram schematically illustrating an internal configuration of a computing device that performs a deep learning model optimization method according to an embodiment of the present disclosure, and FIG. 11 is a diagram illustrating the overall architecture according to one embodiment of the present disclosure.

Referring to FIG. 10, the computing device according to an embodiment of the present disclosure includes a memory 1010 and a processor 1020.

The memory 1010 stores instructions for performing a deep learning model optimization method for medical image segmentation according to an embodiment of the present disclosure.

The processor 1020 may control internal components of the computing device according to an embodiment of the present disclosure and execute instructions stored in the memory 1010. Instructions executed by the processor 1020 may perform each step described with reference to FIG. 1. The overall architecture for this is as shown in FIG. 11.

As described above, the deep learning model optimization method according to an embodiment of the present disclosure may be performed in a form that the self-supervised learning and the meta-learning are combined. In addition, as described above, each training process and test process may update the model parameters based on the results of applying the gradient descent of the loss function based on the few-shot learning for the sample batch, and updates the optimizer parameters based on the results of applying the gradient descent of the loss function based on the one-shot learning based on the updated model parameters, and then reflects the updated optimizer parameters to derive the model parameters.

The apparatus and the method according to the embodiment of the present disclosure may be implemented in a form of program commands that may be executed through various computer means and may be recorded in a computer-readable recording medium. The computer-readable recording medium may include a program command, a data file, a data structure, or the like, alone or a combination thereof. The program command recorded in the computer-readable recording medium may be especially designed and constituted for the present disclosure or may be known and usable by those skilled in the field of computer software. Examples of the computer-readable recording medium may include magnetic media such as a hard disk, a floppy disk, and a magnetic tape; optical media such as a compact disk read only memory (CD-ROM) or a digital versatile disk (DVD); magneto-optical media such as a floptical disk; and a hardware device specially configured to store and execute program commands, such as a read-only memory (ROM), a random access memory (RAM), a flash memory, or the like. Examples of the program commands include a high-level language code capable of being executed by a computer using an interpreter, or the like, as well as a machine language code made by a compiler.

The above-mentioned hardware device may be constituted to be operated as one or more software modules in order to perform an operation according to the present disclosure, and vice versa.

Hereinabove, the present disclosure has been described with reference to exemplary embodiments thereof. It will be understood by those skilled in the art to which the present disclosure pertains that the present disclosure may be implemented in a modified form without departing from essential characteristics of the present disclosure. Therefore, the exemplary embodiments disclosed herein should be considered in an illustrative aspect rather than a restrictive aspect. The scope of the present disclosure should be defined by the claims rather than the above-mentioned description, and equivalents to the claims should be interpreted to fall within the present disclosure.

What is claimed is:

1. A deep learning model optimization method for medical image segmentation, comprising:
   (a) initializing a model parameter;
   (b) updating the model parameter by performing Model-Agnostic Meta Learning (MAML) on a model based on sample batch and applying a gradient descent algorithm to a loss function;
   (c) setting an optimizer parameter as the updated model parameter, performing one-shot meta-learning on the model, and then updating the optimizer parameter by applying the gradient descent algorithm to the loss function; and
   (d) updating the model parameter by reflecting the updated optimizer parameter, wherein the loss function calculates a sum of a cross entropy loss and an average Hausdorff distance loss.

2. The deep learning model optimization method of claim 1, wherein a test process is further performed after the step (d), and the test process further performs the steps (a) to (d) based on a query data set to find a final model parameter.

3. The deep learning model optimization method of claim 1, wherein in the step (b), a meta learning is few-shot learning.

4. The deep learning model optimization method of claim 1, wherein the average Hausdorff distance loss is calculated using equation below:

$$L_{AHDLoss}(X, Y) = \left( \frac{1}{X} \sum_{x \in X} \min_{y \in Y} D_{dist}(x, y) + \frac{1}{Y} \sum_{y \in Y} \min_{x \in X} D_{dist}(x, y) \right) / 2$$

wherein, X and Y represent a predicted value and an actual measured value, respectively, $D_{dist}(x,y)$ represents a function that derives a distance to x and y, and min represents a function that derives a minimum value.

5. A non-transitory computer-readable recording medium in which a program code for performing the method of claim 1 is recorded.

6. A computing device, comprising:
a memory storing at least one instruction; and
a processor executing the instruction stored in the memory,
wherein the instruction executed by the processor includes:
initializing a model parameter;
updating the model parameter by performing meta-learning on a model (MAML: Model-Agnostic Meta Learning) based on sample batch and applying a gradient descent algorithm to a loss function;
setting an optimizer parameter as the updated model parameter, performing one-shot meta-learning on the model, and then updating the optimizer parameter by applying the gradient descent algorithm to the loss function; and
deriving a final model parameter by repeatedly performing a training process and a test process including the updating of the model parameter by reflecting the updated optimizer parameter,
wherein the loss function calculates a sum of a cross entropy loss and an average Hausdorff distance loss.

7. The computing device of claim 6, wherein the meta learning is few-shot learning.

8. The computing device of claim 6, wherein the average Hausdorff distance loss is calculated using equation below:

$$L_{AHDLoss}(X, Y) = \left(\frac{1}{X}\sum_{x \in X}\min_{y \in Y}D_{dist}(x, y) + \frac{1}{y}\sum_{y \in Y}\min_{x \in X}D_{dist}(x, y)\right)/2$$

wherein, X and Y represent a predicted value and an actual measured value, respectively, $D_{dist}(x,y)$ represents a function that derives a distance to x and y, and min represents a function that derives a minimum value.

* * * * *